United States Patent
Kautzky et al.

(10) Patent No.: US 11,875,826 B1
(45) Date of Patent: Jan. 16, 2024

(54) HEAT-ASSISTED MAGNETIC RECORDING HEAD WITH A BILAYER ADHESION STRUCTURE

(71) Applicant: Seagate Technology LLC, Fremont, CA (US)

(72) Inventors: Michael C Kautzky, Eagan, MN (US); Venkateswara R Inturi, Shakopee, MN (US); XiaoYue Phillip Huang, Edina, MN (US); Lance Edward Nevala, Chanhassen, MN (US); Tong Zhao, Eden Prairie, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 18/062,397

(22) Filed: Dec. 6, 2022

Related U.S. Application Data

(60) Provisional application No. 63/291,818, filed on Dec. 20, 2021.

(51) Int. Cl.
| | | |
|---|---|---|
| *G11B 5/40* | (2006.01) | |
| *G11B 5/31* | (2006.01) | |
| *G11B 13/08* | (2006.01) | |
| *G11B 5/60* | (2006.01) | |
| *G11B 5/00* | (2006.01) | |

(52) U.S. Cl.
CPC ............ *G11B 5/314* (2013.01); *G11B 5/6088* (2013.01); *G11B 13/08* (2013.01); *G11B 2005/0021* (2013.01)

(58) Field of Classification Search
CPC ..... G11B 33/1446; G11B 5/012; G11B 5/314; G11B 13/08; G11B 2005/0021; G11B 5/7375; G11B 5/255; G11B 5/3133; G11B 5/7379; G11B 5/3917; G11B 11/10536; G11B 5/187; G11B 5/40
USPC .......................................................... 360/59
See application file for complete search history.

(56) References Cited

U.S. PATENT DOCUMENTS

| | | |
|---|---|---|
| 8,976,634 B2 | 3/2015 | Cheng et al. |
| 9,666,220 B2 | 5/2017 | Sankar et al. |
| 9,691,423 B2 | 6/2017 | Huang et al. |
| 9,747,939 B2 * | 8/2017 | Zhao ..................... G11B 5/3133 |
| 9,767,832 B2 | 9/2017 | Brons et al. |
| 9,865,283 B2 | 1/2018 | Blaber et al. |

* cited by examiner

*Primary Examiner* — Nabil Z Hindi

(57) ABSTRACT

A heat-assisted magnetic recording head includes a first feature, a second feature, and a bilayer adhesion structure. The first feature includes a first primary metal. The second feature includes an oxide region, and a mixed metal oxide adhesion layer that is adhered to the oxide region and provided on a surface of the second feature. The bilayer adhesion structure includes the mixed metal oxide adhesion layer of the second feature, and a metal adhesion layer. The metal adhesion layer is disposed between and adhered to the first feature and the mixed metal oxide adhesion layer of the second feature. The metal adhesion layer includes a second primary metal that is different than the first primary metal.

20 Claims, 5 Drawing Sheets

HEAT-ASSISTED MAGNETIC RECORDING HEAD WITH A BILAYER ADHESION STRUCTURE

This application claims priority to U.S. Provisional Patent Application Ser. No. 63/291,818, entitled "HEAT-ASSISTED MAGNETIC RECORDING HEAD WITH A BILAYER ADHESION STRUCTURE" and filed Dec. 20, 2021, the entire contents of which are hereby incorporated by reference.

TECHNICAL FIELD

The disclosure relates to a heat-assisted magnetic recording head of a hard disk drive.

BACKGROUND

Some hard disk drives (HDDs) utilize heat-assisted magnetic recording (HAMR) to increase the areal density of the HDD. A recording head of a HAMR HDD typically includes a laser, a near-field transducer (NFT) configured to briefly heat a small hot spot on a surface of a magnetic disk of the HDD, and a write pole configured to write data to the magnetic disk in the vicinity of the hot spot. A typical HAMR recording head includes many metal/dielectric interfaces between features and/or layers of the HAMR recording head. Adhesion at these interfaces is a consideration of HAMR recording head design and operational lifetime. Specifically, thermal exposure of a metal/dielectric interface during fabrication of a HAMR recording head and/or during operation of a HAMR recording head may degrade the interface, thus potentially reducing the performance and/or life expectancy of the HAMR recording head and the HDD.

SUMMARY

The present disclosure describes a heat-assisted magnetic recording (HAMR) head having a bilayer adhesion structure between a metal feature and a dielectric feature. An example bilayer adhesion structure of this disclosure includes a metal adhesion layer and a mixed metal oxide adhesion layer. A bilayer adhesion structure may, in some examples, provide a metal/dielectric interface of a HAMR head with resistance to degradation from thermal stress during fabrication and/or operation of the HAMR head, which may prolong the performance and/or lifetime of the HAMR head. The use of a bilayer adhesion structure at a metal/dielectric interface of a HAMR head may also enable the inclusion of metals in one or more of the adhesion layers which do not diffuse away from the metal/dielectric interface under thermal stress, potentially further protecting the integrity of the metal/dielectric interface.

In one example, a heat-assisted magnetic recording head includes a first feature including a first primary metal, a second feature including: an oxide region; and a mixed metal oxide adhesion layer that is adhered to the oxide region and provided on a surface of the second feature, and a bilayer adhesion structure including: the mixed metal oxide adhesion layer of the second feature; and a metal adhesion layer that is disposed between and adhered to the first feature and the mixed metal oxide adhesion layer of the second feature, wherein the metal adhesion layer includes a second primary metal that is different than the first primary metal.

In another example, a heat-assisted magnetic recording head includes a first feature including a first primary metal, a second feature including: an oxide region; and a mixed metal oxide adhesion layer, and a bilayer adhesion structure including: the mixed metal oxide adhesion layer of the second feature; and a metal adhesion layer including a second primary metal that is different than the first primary metal, wherein the first feature, the metal adhesion layer, the mixed metal oxide adhesion layer, and the oxide region are provided in a layered configuration along a layering axis, wherein a first surface of the mixed metal oxide adhesion layer is adhered to a surface of the oxide region, wherein a first surface of the metal adhesion layer is adhered to a second surface of the mixed metal oxide adhesion layer, and wherein a surface of the first feature is adhered to a second surface of the metal adhesion layer.

These and other features and aspects of various examples may be understood in view of the following detailed discussion and accompanying drawings.

DETAILED DESCRIPTION

Figure 1:
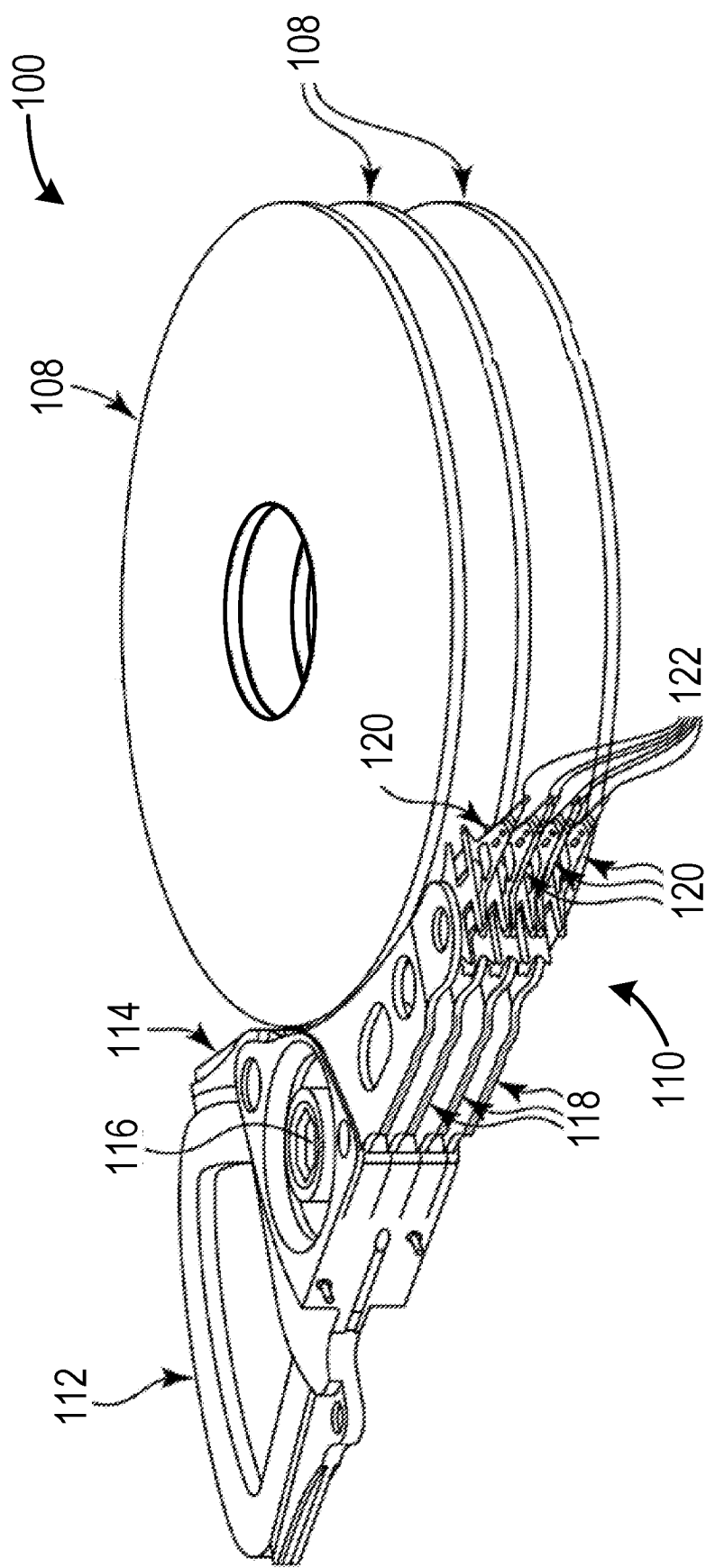
FIG. 1 is a perspective view of an example hard disk drive, in accordance with aspects of this disclosure.

FIG. 1 is a perspective view of an example heat-assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 122. Each slider 122 includes a heat-assisted magnetic recording (HAMR) head (not shown) configured to read data from and write data to a surface of a magnetic disk 108. In one example, a HAMR head includes a writer, a reader, at least one heater (e.g., a reader heater, a writer heater, or both), a waveguide, and a near-field transducer (NFT).

HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 122, to move relative to magnetic disks 108.

Figure 2:
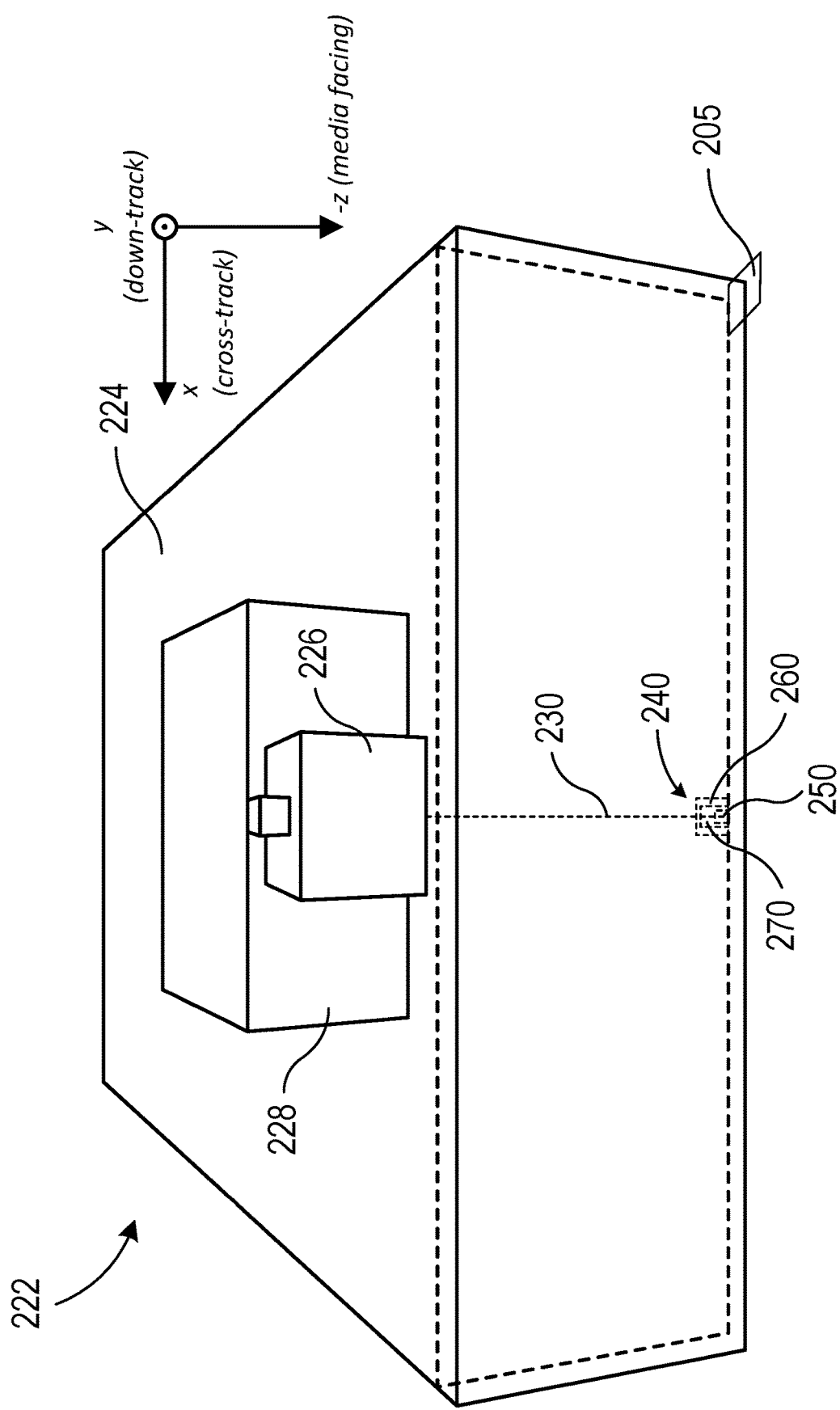
FIG. 2 is a perspective view of an example slider, in accordance with aspects of this disclosure.

FIG. 2 is a perspective view of an example slider 222, in accordance with aspects of this disclosure. Slider 222 may be an example of slider 122 of FIG. 1. Slider 222 includes slider body 224, laser 226, submount 228, and HAMR head 240. HAMR head 240 includes waveguide 230, near-field transducer (NFT) 250, writer 260, and reader 270. In the example of FIG. 2, some features or parts of features of NFT 250, writer 260, and reader 270 are presented on a media-facing air-bearing surface (ABS) 205 that is positioned over a surface of a magnetic disk (not shown) during some operations of the HDD (e.g., write operations, read operations, data maintenance operations). During such operations, ABS 205 faces and is held proximate to the moving magnetic disk surface by a cushion of gas known as an active air bearing (AAB) that is produced from a dynamic flow of gas across a pattern of recessed sub-surfaces bound within the volume of slider body 224 by ABS 205.

Laser 226 is configured to emit photons of a target wavelength. In some examples, laser 226 emits photons with a wavelength in the near infrared range (e.g., approximately 830 nm) or visible range. Examples of laser 226 include an optically pumped semiconductor laser, a quantum well laser, an integrated laser, or other suitable laser. Laser 226 of this example may be configured as an edge emitting laser (EEL), vertical cavity surface emitting laser (VCSEL), or other type of laser. Other example HAMR heads may include other types of light sources such as light emitting diodes (LEDs) and surface emitting diodes.

Laser 226 is fixed to slider body 224 via submount 228. In the example of FIG. 2, laser 226 and submount 228 are located on a face of slider body 224 which is opposite to ABS 205. In other example HAMR sliders, a laser may be directly mounted to the slider body (i.e., without a submount). Submount 228 may be configured to redirect photons output from laser 226 so that the photons are directed into waveguide 230 in the negative z-direction of FIG. 2 (e.g., toward NFT 250). The path between laser 226 and waveguide 230 may include one or more optical couplers, mode converters, and/or mode couplers. Waveguide 230 is formed integrally within slider body 224 and is configured to deliver photons from laser 226 to NFT 250.

NFT 250 is configured to create a small hot spot on a magnetic disk. For example, NFT may generate and support a distribution of localized surface plasmons (LSPs) upon receiving incident photons from laser 226 by way of waveguide 230 and may condense the LSP distribution on an area or feature of NFT 250. NFT 250 amplifies a near-field of the condensed LSP distribution and focuses the near-field toward a surface of a magnetic disk (e.g., a magnetic disk 108 of FIG. 1) to produce a hot spot. Writer 260 is configured to generate a magnetic field from an electrical current and aim the magnetic field at the hot spot on the magnetic disk. The near-field energy heats and lowers the coercivity of the magnetic grains in the hot spot, thereby enabling these magnetic grains to be oriented by the magnetic field generated by writer 260. Turning off laser 226 or moving NFT 250 toward a different location of the magnetic disk (or moving the magnetic disk such that NFT 250 faces a different location of the magnetic disk) removes the focused near-field energy from the hot spot. Removing the near-field energy allows the magnetic grains contained in the spot to cool. The cooling locks in the grain orientation induced by the magnetic field generated by writer 260, thus preserving the bits of written data.

Figure 3:
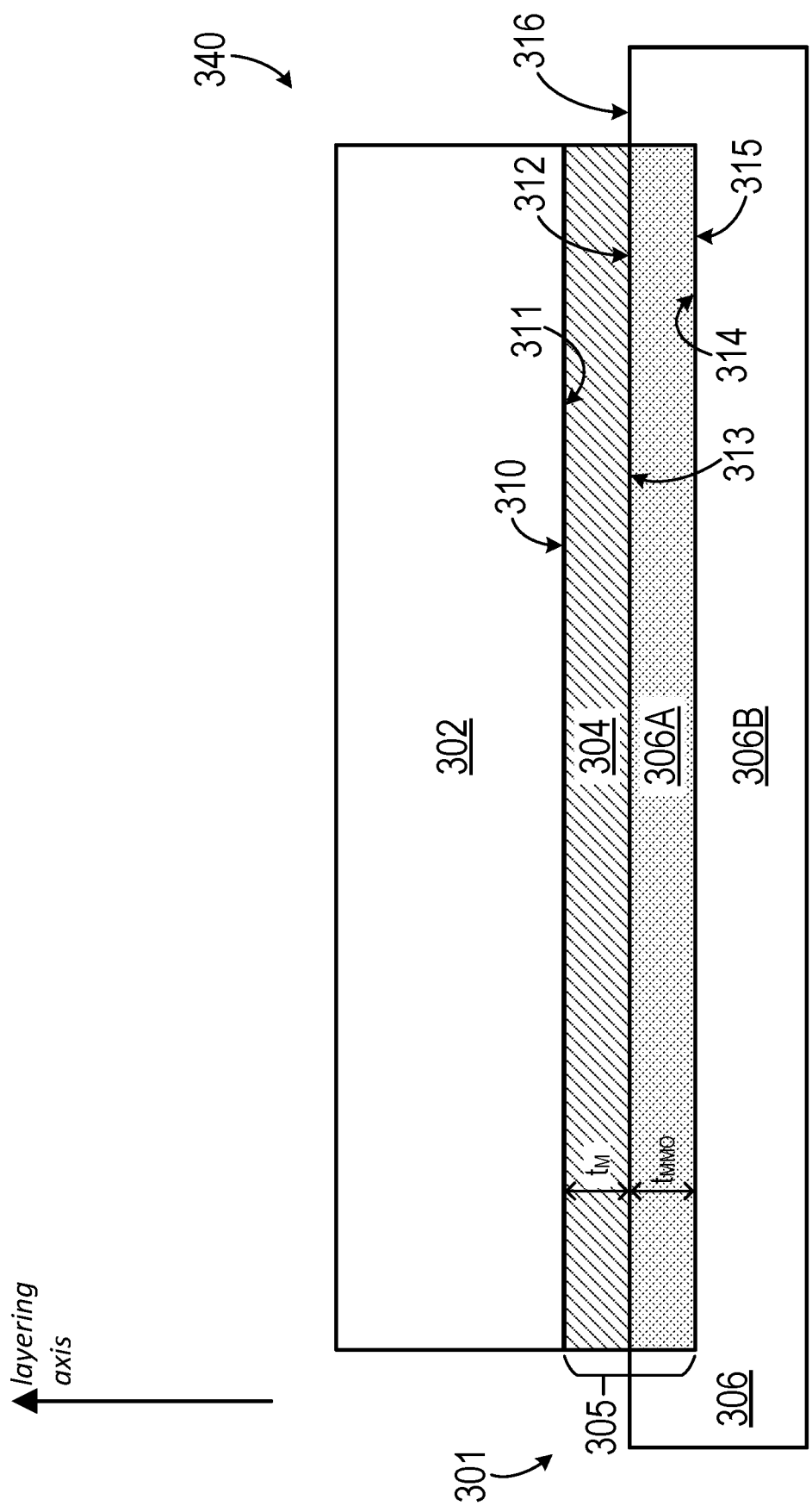
FIG. 3 is a cross-sectional view of an example interface of a HAMR head, in accordance with aspects of this disclosure.

FIG. 3 is a cross-sectional view of an example interface of a HAMR head, in accordance with aspects of this disclosure. HAMR head 340 may be an example of HAMR head 240 of FIG. 2. Interface 301 is an interface between a first feature 302 of HAMR head 340 and a second feature 306 of HAMR head 340. First feature 302 may be an NFT of HAMR head 340 or another feature of HAMR head 340. In some examples, first feature 302 is a feature of an NFT of HAMR head 340 (e.g., a disk, a peg). Second feature 306 is a dielectric feature that includes an oxide region 306B. Second feature 306 may be an optical feature such a waveguide or a layer of a waveguide, an optical reflector, a cladding layer, or another dielectric feature of HAMR head 340.

First feature 302 is a metal feature that includes a first primary metal. As used herein the term "primary" refers to a metal that is present in a layer or feature in an amount (e.g., atomic percentage or weight percentage) that is greater than any other metal that is also present in the same layer or feature. For example, if a layer or feature comprises 40% at. metal A, 30% at. metal B, and 30% at. metal C, the primary metal of the layer or feature would be A. Minor constituents B and C, if present, would be contained in the layer or feature in an amount less than the primary metal A. In some examples, the layer or feature comprises about 50% at. or greater of the primary metal. In some examples, the layer or feature comprises about 90% at. or greater of the primary metal. In yet other examples, the layer or feature comprises about 95 at. % or greater of the primary metal. In still other examples, the layer or feature comprises about 99% at. or greater of the primary metal.

In accordance with aspects of this disclosure, interface 301 between first feature 302 and second feature 306 of HAMR head 340 includes a bilayer adhesion structure 305. Bilayer adhesion structure 305 includes a mixed metal oxide adhesion layer 306A and a metal adhesion layer 304. Mixed metal oxide adhesion layer 306A is part of second feature 306. Mixed metal oxide adhesion layer 306A is adhered to oxide region 306B and provided on a surface 316 of second feature 306. Metal adhesion layer 304 is disposed between and adhered to first feature 302 and mixed metal oxide adhesion layer 306A of second feature 306.

Including bilayer adhesion structure 305 in interface 301 may, in some examples, make interface 301 more robust and resistant to degradation during fabrication and/or operation of HAMR head 340. For example, the first primary metal of first feature 302 may be a noble metal including gold, ruthenium, rhodium, palladium, osmium, iridium, platinum, or silver. The first primary metal of first feature 302 may have poor adhesion to a dielectric of second feature 306, such as an oxide of oxide region 306B. Including bilayer adhesion structure 305 may improve the adhesion between first feature 302 and second feature 306 and may enable interface 301 to maintain thermal stability, resist defects, and/or otherwise maintain integrity under conditions such as thermal exposure. Such stability and defect resistance of interface 301 may enable sustained performance and/or longer lifetime of HAMR head 340.

In some examples, metal adhesion layer 304 comprises a second primary metal that is different than the first primary metal of first feature 302. In some examples, first feature 302 comprises a first primary metal that is gold and metal adhesion layer 304 comprises a secondary metal that is selected from iridium, platinum, palladium, rhodium, osmium, rhenium, tungsten, or combinations thereof. In a specific example, the first primary metal is gold and the second primary metal is iridium.

In some embodiments, the first primary metal of first feature 302 and second primary metal of metal adhesion layer 304 are deposited separately, with each being in the form of a high purity (e.g., 99% at. or greater) metal species. For example, metal adhesion layer 304 may be deposited as a layer of iridium, and first feature 302 may be deposited as a layer of gold, a gold alloy, or a gold composite that is deposited onto metal adhesion layer 304.

In some examples, a different metal of metal adhesion layer 304 may be characterized by a change in material composition across an interface between first feature 302 and metal adhesion layer 304. For example, a material composition may change by greater than 90% atomic percent or weight percent over a distance of 10 nm between first feature 302 and metal adhesion layer 304. In some examples, a material composition changes by greater than 95% at. over a distance of 10 nm between first feature 302 and metal adhesion layer 304. In some examples, a material composition changes by greater than 99% at. over a distance of 10 nm between first feature 302 and metal adhesion layer 304.

Certain metals may have favorable properties that may provide advantages to metal adhesion layer 304 and interface 301. For example, iridium, platinum, palladium, rhodium, osmium, rhenium, tungsten, and/or other metals may be desirable for metal adhesion layer 304 due to their good adhesion to the first metal of first feature 302, their thermal stability, their resistance to diffusion away from interface 301 under thermal exposure, and/or other favorable adhesive properties. In other examples, a metal that is included in metal adhesion layer 304 may be selected based on having a low impact on optical properties of interface 301. This may be a consideration when interface 301 is an interface on or near which localized surface plasmons are generated or when interface 301 is between a dielectric and an optical reflector. However, metals that have favorable properties for interface 301 may also have properties that make them unfavorable for including in an adhesion structure that is not a bilayer adhesion structure (e.g., a single layer adhesion structure). For example, some metals may not adhere well to dielectric features such as oxide region 306B of second feature 306. Some metals may be sensitive to surface condition and may have poor adhesion along sharp geometric features such as those that may be found in HAMR head 340. In other instances, a metal of metal adhesion layer 304 that is adhered to an oxide of oxide region 306B may delaminate and/or develop other defects under prolonged thermal exposure. Including mixed metal oxide adhesion layer 306A between oxide region 306B and metal adhesion layer 304 may mitigate some of these issues and may enable metal adhesion layer 304 to include metals with properties that are favorable to interface 301 but may adhere poorly to second feature 306 without the inclusion of mixed metal oxide adhesion layer 306A. That is, bilayer adhesion structure 305 may provide greater flexibility in selecting materials that are used in the adhesion structure (e.g., in metal adhesion layer 304) than other adhesion structures (e.g., single layer adhesion structures).

Mixed metal oxide adhesion layer 306A may be formed by depositing or otherwise introducing a reducing metal to oxide region 306B of second feature 306. Prior to the introduction of the reducing metal, second feature 306 includes oxide region 306B without mixed metal oxide adhesion layer 306A. Depositing or otherwise introducing the reducing metal to oxide region 306B may include depositing the reducing metal onto a surface of oxide region 306B by physical vapor deposition, ion beam deposition, evaporation (e.g., thermal evaporation, electron beam evaporation), sputtering, atomic layer deposition, electroplating, or another means of material deposition.

Oxide region 306B includes an oxide of an element. For example, the element may be silicon, aluminum, or niobium, and thus oxide region 306B of these examples would include silicon dioxide, aluminum oxide, or niobium oxide, respectively. The reducing metal used to convert the surface of oxide region 306B to mixed metal oxide adhesion layer 306A is configured to reduce the oxide of oxide region 306B of the second feature 306 by depositing or otherwise introducing the reducing metal onto surface 316 of second feature 306. The reduction may free oxygen from the oxide of the element, and the free oxygen may then oxidize the reducing metal. This reaction produces mixed metal oxide adhesion layer 306A on the surface of second feature 306. Mixed metal oxide adhesion layer 306A thus includes the element (i.e., the product of reduction of the oxide of oxide region 306B) and an oxide of the reducing metal. That is, mixed metal oxide adhesion layer 306A includes a first species that results from oxidation of the reducing metal and a second species that results from reduction of the oxide of oxide region 306B by the reducing metal. The product of the reduction may be the element in the cation state. The second metal of metal adhesion layer 304 may adhere better to the element (e.g., the cation of the element) of mixed metal oxide adhesion layer 306A than to the oxide of the element of oxide region 306B. The better adhesion may be due to the more metallic property of mixed metal oxide adhesion layer 306A resulting from the presence of the cation of the element. As such, the inclusion of mixed metal oxide adhesion layer 306A may enable metal adhesion layer 304 to include a metal that has favorable properties for interface 301 but that does not adhere well directly to oxide region 306B.

The reducing metal may be selected based on its free energy of oxide formation. For example, the free energy of oxide formation of the reducing metal is greater than the free energy of oxide formation of the element. In some examples, the reducing metal is beryllium, cerium, calcium, dysprosium, gadolinium, europium, hafnium, erbium, lanthanum, magnesium, lutetium, holmium, lithium, plutonium, praseodymium, terbium, strontium, samarium, scandium, thorium, thulium, ytterbium, yttrium, or combinations thereof. In some examples, the reducing metal is yttrium.

In the example of HAMR head 340, first feature 302, metal adhesion layer 304, mixed metal oxide adhesion layer 306A of second feature 306, and oxide region 306B of second feature 306 are provided in a layered configuration. The layering is along a layering axis of FIG. 3. Surfaces of the respective features are adhered to each other to form interface 301. A first surface 314 of mixed metal oxide adhesion layer 306A is adhered to a surface 315 of oxide region 306B. A first surface 312 of metal adhesion layer 304 is adhered to a second surface 313 of mixed metal oxide adhesion layer 306A. A surface 310 of first feature 302 is adhered to a second surface 311 of metal adhesion layer 304.

The layered configuration of first feature 302, metal adhesion layer 304, mixed metal oxide adhesion layer 306A of second feature 306, and oxide region 306B of second feature 306 may also include the respective surfaces of these features. A surface of a first feature of HAMR head 340 that is adhered to a surface of a second feature of HAMR head 340 may be substantially orthogonal to the layering axis. The surface of the second feature that the surface of the first feature is adhered to may also be substantially orthogonal to the layering axis. Thus, the surface of the first feature and the surface of the second feature may be substantially parallel to each other. In some examples, surface 315 of oxide region 306B, first surface 314 of mixed metal oxide adhesion layer 306A, second surface 313 of mixed metal oxide adhesion layer 306A, first surface 312 of metal adhesion layer 304, second surface 311 of metal adhesion layer 304, and surface 310 of first feature 302 are substantially parallel to each other.

Second surface 313 of mixed metal oxide adhesion layer 306A may include products of the reaction that occurs when the reducing metal is deposited or otherwise introduced to oxide region 306B. For example, second surface 313 of mixed metal oxide adhesion layer 306A may include a first species that results from oxidation of the reducing metal and a second species that results from reduction of the oxide of oxide region 306B by the reducing metal. That is, oxide region may include an oxide of an element (e.g., silicon dioxide, aluminum oxide, niobium oxide), and second surface 313 of mixed metal oxide adhesion layer 306A may include the element (e.g., silicon, aluminum, niobium). In some instances, the element on second surface 313 of mixed metal oxide adhesion layer 306A is the element in the cation state. In some examples, the presence of the element may enable improved adhesion between second feature 306 and metal adhesion layer 304. That is, metal adhesion layer 304 may adhere more strongly to the element of second surface 313 of mixed metal oxide adhesion layer 306A than to the oxide of the element of oxide region 306B. Including mixed metal oxide adhesion layer 306A may thus enable metal adhesion layer 304 to include metals that have favorable properties for interface 301 but do not adhere well to the oxide of oxide region 306B.

Mixed metal oxide adhesion layer 306A may have a thickness $t_{MMO}$ in a dimension of the layering axis of interface 301. Thickness $t_{MMO}$ may be selected to provide a sufficient concentration of the element (e.g., a concentration of the element on second surface 313) to enable thermally robust adhesion between mixed metal oxide adhesion layer 306A and metal adhesion layer 304. In some examples, thickness $t_{MMO}$ of mixed metal oxide adhesion layer is from about 0.1 angstrom to about 10 angstroms in a dimension of the layering axis.

Metal adhesion layer 304 may have a thickness t M in a dimension of the layering axis of interface 301. Thickness t M may be selected to provide a robust adhesive interface between mixed metal oxide adhesion layer 306A and first feature 302 without significant impact to the optical properties of interface 301. For example, thickness t M may be selected to minimize optical absorption by metal adhesion layer 304 and/or to minimize the impact to localized surface plasmon generation at interface 301. In some examples, thickness t M of metal adhesion layer 304 is from about 0.1 angstrom to about 10 angstroms in a dimension of the layering axis.

Figure 4:
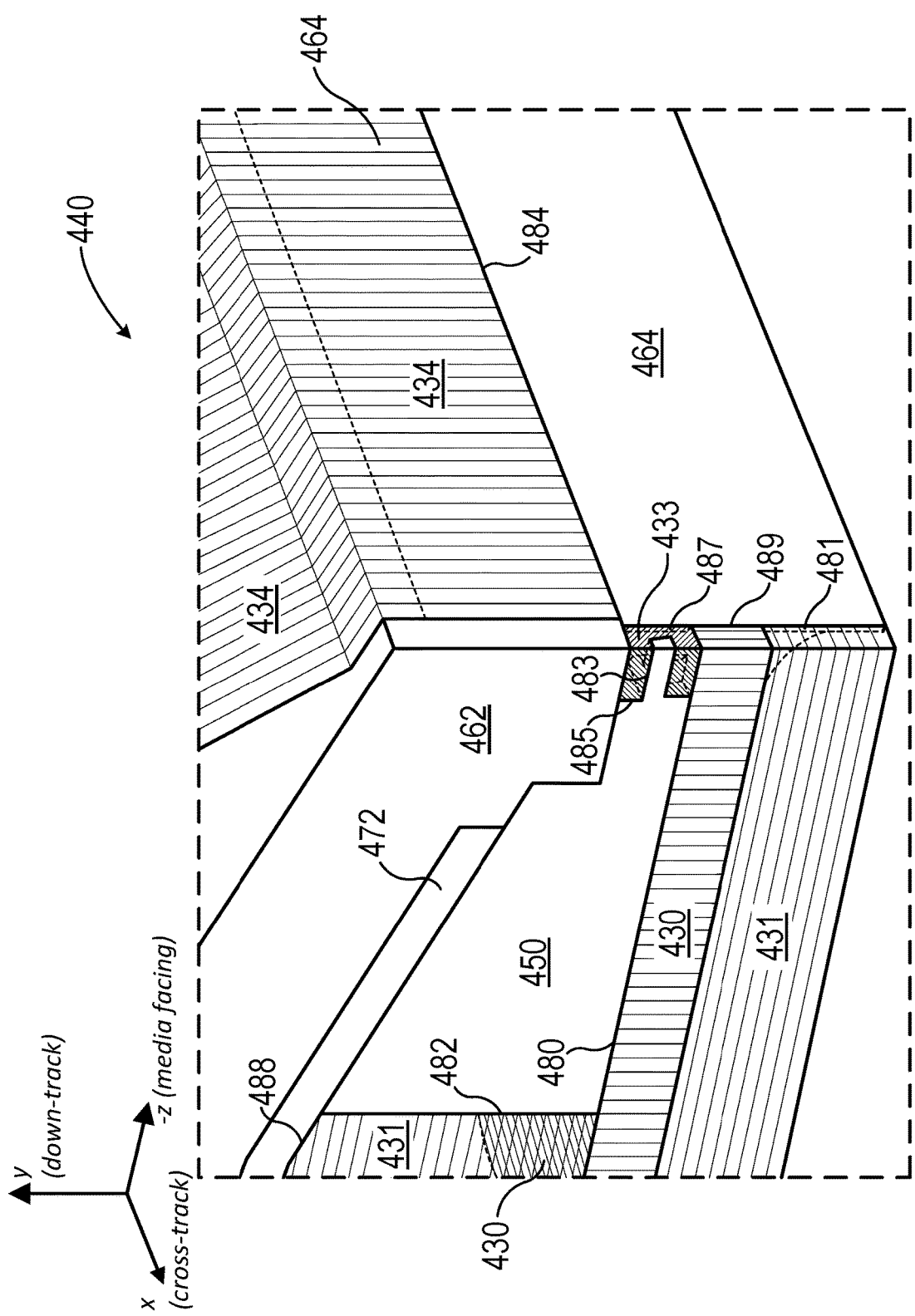
FIG. 4 is a cross-sectional perspective view of an example HAMR head, in accordance with aspects of this disclosure.

FIG. 4 is a cross-sectional perspective view of an example HAMR head, in accordance with aspects of this disclosure. HAMR head 440 may be an example of HAMR head 240 of FIG. 2. HAMR head 440 includes metal features of an NFT 450, a write pole 462, a diffuser 472, and a miniature solid immersion mirror (mSIM) 464. Metal features of HAMR head 440 may include gold and/or other noble metals including ruthenium, rhodium, palladium, osmium, iridium, platinum, or silver.

Write pole 462 is configured to direct a magnetic field produced by writer coils (not shown) toward a surface of a magnetic disk (e.g., substantially along the media facing −z axis of FIG. 4) to preferably orient grains of the magnetic disk into bits of data which are stored for later retrieval. The magnetic field from write pole 462 may coincide with a hot spot on the surface of the magnetic disk that NFT 450 produces. This enables write pole 462 to orient grains of the magnetic disk in an area where the coercivity has been lowered by the hot spot from NFT 450.

Diffuser 472 is a heat sink structure that is configured to draw heat generated by the HAMR process away from NFT 450, write pole 462, and/or other features of HAMR head 440, and dissipate the heat toward other, less thermally sensitive areas of HAMR head 440 and its associated slider. In some examples, diffuser 472 is part of a larger heat sink structure of HAMR head 440. Diffuser 472 may include gold and/or other noble metals including ruthenium, rhodium, palladium, osmium, iridium, platinum, or silver. In some instances, diffuser 472 includes the same metal or metals that are included in NFT 450.

Miniature solid immersion mirror (mSIM) 464 is configured to improve LSP coupling efficiency and reduce required laser power by blocking scattered incident photons from a source (e.g., laser 226 of FIG. 2), blocking photons from reaching external surfaces such as a surface of a magnetic disk, and reducing reflection from surfaces such as an air-bearing surface (ABS). mSIM 464 may include gold and/or other noble metals including ruthenium, rhodium, palladium, osmium, iridium, platinum, or silver.

HAMR head 440 also includes dielectric features that include a waveguide 430, cladding layers 431, a dielectric spacing layer 433, and a dielectric layer 434. Dielectric features of HAMR head 440 may include silicon dioxide, aluminum oxide, niobium oxide, and/or other oxides. The dielectric features of HAMR head 440 serve different functions. Optical layers such as waveguide 430 and cladding layers 431 are configured to support LSP generation on NFT 450 by directing photons from a light source toward NFT 450 and couple the photons to a feature or features of NFT 450. Resonance coupling between the photons and free electrons of NFT 450 may generate LSPs on NFT 450. Other dielectric layers of HAMR head 440 (e.g., dielectric spacing layer 433, dielectric layer 434) may support light reflection, blocking, and/or focusing. Dielectric spacing layer 433 is provided along an air-bearing surface (ABS) 405 of HAMR head 440. Dielectric spacing layer 433 may support LSP focusing on NFT 450 in order to produce a focused near-field which is directed toward a surface of a magnetic disk.

HAMR head 440 includes multiple metal/dielectric interfaces. For example, interface 480 is an interface between NFT 450 and waveguide 430. Interface 481 is an interface between mSIM 464 and cladding layer 431. Interface 482 is an interface between NFT 450 and cladding layer 431. Interface 483 is an interface between NFT 450 and dielectric spacing layer 433. Interface 484 is an interface between mSIM 464 and dielectric layer 434. Interface 485 is an interface between NFT 450 and dielectric spacing layer 433. Interface 487 is an interface between mSIM 464 and dielectric spacing layer 433. Interface 488 is an interface between diffuser 472 and cladding layer 431. Interface 489 is an interface between mSIM 464 and waveguide 430.

Each of these interfaces, as well as other interfaces of HAMR head 440 that are not shown, may be an interface between a first feature (e.g., NFT 450, mSIM 464, diffuser 472) and a second feature (e.g., waveguide 430, cladding layers 431, dielectric spacing layer 433, dielectric layer 434) of HAMR head 440. Each of these interfaces may suffer from adhesion failure during operation of the HAMR head. Accordingly, adhesion of these interfaces may be improved by including a bilayer adhesion structure comprising a mixed metal oxide adhesion layer of the second feature and a metal adhesion layer disposed between and adhered to the first feature and the mixed metal oxide adhesion layer of the second feature. The metal adhesion layer of these example interfaces includes a second metal that is different than the first metal.

In some examples, the inclusion of a bilayer adhesion structure in on ore more of the interfaces of HAMR head 440 (including those not shown) may provide the interface with thermal stability and resistance to defects under thermal stress. Increasing the thermal robustness of these interfaces may, in some instances, extend the performance and/or lifetime of HAMR head 440. For example, the inclusion of a bilayer adhesion structure at interface 480 may enable interface 480 to include a metal which has low impact on LSP generation along interface 480 (e.g., a metal included in a metal adhesion layer). In another example, a bilayer adhesion structure at interfaces 483 and/or 485 may provide thermal stability in a region of NFT 450 that gets particularly hot under operation due to the focused near-field of generated LSPs.

Figure 5:
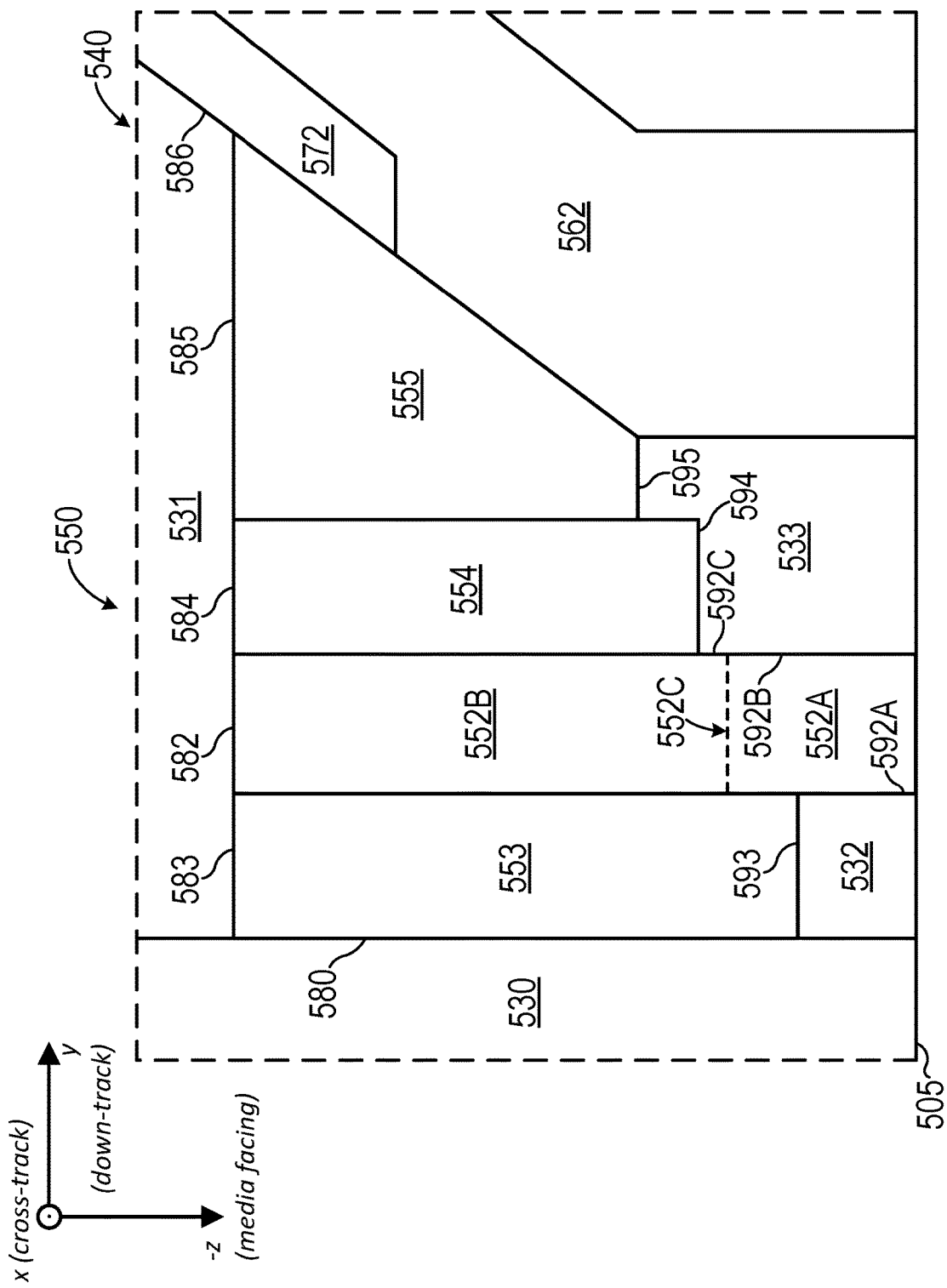
FIG. 5 is a cross-sectional view of an example HAMR head, in accordance with aspects of this disclosure.

FIG. 5 is a cross-sectional view of an example HAMR head, in accordance with aspects of this disclosure. HAMR head 540 may be an example of HAMR head 340 of FIG. 3. HAMR head 540 includes metal features that include an NFT 550, a write pole 562, and a diffuser 572. NFT 550 may include metal features including a heat sink disk 555, a middle disk 554, a peg 552A, and anchor disk 552B, and a plasmonic disk 553. Metal features of HAMR head 540 may include gold and/or other noble metals including ruthenium, rhodium, palladium, osmium, iridium, platinum, or silver.

Plasmonic disk 553 is configured to generate and support LSPs through resonance coupling with incident photons which are generated by a light source (e.g., laser 226 of FIG. 2) and are directed toward NFT 550 by waveguide 530. Plasmonic disk 553 may include a plasmonic metal. As used herein, a plasmonic metal is a metal that possesses properties (e.g., electrical properties, optical properties) that promote resonance coupling between photons incident upon the plasmonic metal and free electrons of the plasmonic metal. Such resonant coupling of a photon with free electrons of the plasmonic metal may excite one or more plasmonic modes of the plasmonic metal, which may result in the generation of an LSP on a surface of the plasmonic metal. Plasmonic metals that demonstrate efficient plasmon generation in response to photons of a wavelength target or range are said to have a high plasmonic figure of merit. Examples of plasmonic metals include gold, silver, ruthenium, copper, aluminum, and/or rhodium. In some instances, plasmonic disk 553 includes one or more of these plasmonic metals and/or another noble metal including palladium, osmium, iridium, or platinum.

Anchor disk 552B is configured to receive and support a distribution of LSPs. In some examples, anchor disk 552B is configured to participate in LSP generation. Peg 552A is configured to emit a near-field to generate a hot spot on a magnetic disk. For example, peg 552A may generate a hot spot by receiving and condensing a distribution of LSPs, amplifying a near-field of the LSP distribution, and emitting an amplified near-field away from an ABS 505 of HAMR head 540 toward a surface of a magnetic disk.

Peg 552A is disposed near ABS 505 of HAMR head 540. In some instances, one or more portions of peg 552A are exposed on ABS 505. In some examples, anchor disk 552B is coupled to peg 552A and is disposed behind peg 552A relative to ABS 505 (e.g., in the z-direction). Anchor disk 552B is configured to serve as an anchor for peg 552A. Peg 552A may be narrower in profile than anchor disk 552B. In some examples, peg 552A and anchor disk 552B form single feature, with peg 552A and anchor disk 552B being two regions of a continuous piece. Peg 552A may protrude from anchor disk 552B in the vicinity of ABS 505.

In other examples, peg 552A and anchor disk 552B are separate, discrete features separated by a defined interface 552C. In examples where peg 552A and anchor disk 552B are two regions of a continuous piece, peg 552A and anchor disk 552B may include the same material(s). For example, peg 552A and anchor disk 552B may both include iridium, rhodium, ruthenium, or a gold (e.g., gold, a gold alloy). In some examples, peg 552A and anchor disk 552B include different materials (e.g., different elements, different alloys, different composites). For example, peg 552A may include iridium, ruthenium, gold, a gold alloy, or a gold composite, and anchor disk 552B may include gold or a different gold alloy or gold composite than peg 552A (e.g., a gold alloy with a different alloying metal, a gold alloy with a different concentration of the same alloying metal that peg 552A includes). In some examples, anchor disk 552B and or peg 552A include gold and/or other noble metals including ruthenium, rhodium, palladium, osmium, iridium, platinum, or silver.

Middle disk 554 is configured to direct LSPs toward an emitting region of NFT (e.g., peg 552A) and/or mitigate background fields. Middle disk 554 of HAMR head 540 is disposed between anchor disk 552B and heat sink disk 555. Middle disk 554 may include a thermally conductive material (e.g., gold) and/or a thermally stable material (e.g., iridium, rhodium). In some examples, heat sink disk 555 includes gold and/or other noble metals including ruthenium, rhodium, palladium, osmium, iridium, platinum, or silver.

Heat sink disk 555 is configured to draw heat away from regions of NFT 550 and direct the heat toward other regions of HAMR head 540. In the example of HAMR head 540, heat sink disk 555 is coupled to diffuser 572. Heat sink disk 555 may include a thermally conductive material, such as gold. In some examples, heat sink disk 555 includes gold and/or other noble metals including ruthenium, rhodium, palladium, osmium, iridium, platinum, or silver.

HAMR head 540 also includes dielectric features that include a waveguide 530, a cladding layer 531, a first dielectric spacing layer 532, and a second dielectric spacing layer 533. Dielectric features of HAMR head 540 may include silicon dioxide, aluminum oxide, niobium oxide, and/or other oxides.

HAMR head 540 includes multiple metal/dielectric interfaces. For example, interface 580 is an interface between plasmonic disk 553 and waveguide 530. Interface 583 is an interface between plasmonic disk 553 and cladding layer 531. Interface 582 is an interface between anchor disk 552B and cladding layer 531. Interface 584 is an interface between middle disk 554. Interface 585 is an interface between heat sink disk 555 and cladding layer 531. Interface 586 is an interface between diffuser 572 and cladding layer 531. Interface 593 is an interface between plasmonic disk 553 and first dielectric spacing layer 532. Interface 592A is an interface between peg 552A and first dielectric spacing layer 532. Interface 592B is an interface between peg 552A and second dielectric spacing layer 533. Interface 592C is an interface between anchor disk 552B and second dielectric spacing layer 533. Interface 594 is an interface between middle disk 554 and second dielectric spacing layer 533. Interface 595 is an interface between heat sink disk 555 and second dielectric spacing layer 533.

Each of these interfaces, as well as other interfaces of HAMR head 540 that are not shown, may be an interface between a first feature (e.g., diffuser 572, heat sink disk 555, middle disk 554, peg 552A, anchor disk 552B, plasmonic disk 553.) and a second feature (e.g., waveguide 530, cladding layers 531, first dielectric spacing layer 532, second dielectric spacing layer 533) of HAMR head 540. That is, one or more of the interfaces (e.g., interfaces 580, 583, 582, 584, 585, 586, 593, 592A, 592B, 592C, 594, 595) represented in HAMR head 540 of FIG. 5 may include a bilayer adhesion structure that includes a mixed metal oxide adhesion layer of the second feature and a metal adhesion layer disposed between and adhered to the first feature and the mixed metal oxide adhesion layer of the second feature.

The metal adhesion layer of these example interfaces includes a second metal that is different than the first metal.

In some examples, the inclusion of a bilayer adhesion structure in on ore more of the interfaces of HAMR head 540 (including those not shown) may provide the interface with thermal stability and resistance to defects under thermal stress. Increasing the thermal robustness of these interfaces may, in some instances, extend the performance and/or lifetime of HAMR head 540.

Various examples have been presented for the purposes of illustration and description. These and other examples are within the scope of the following claims.

What is claimed is:

1. A heat-assisted magnetic recording head comprising:
   a first feature comprising a first primary metal,
   a second feature comprising:
      an oxide region; and
      a mixed metal oxide adhesion layer that is adhered to the oxide region and provided on a surface of the second feature, and
   a bilayer adhesion structure comprising:
      the mixed metal oxide adhesion layer of the second feature; and
      a metal adhesion layer that is disposed between and adhered to the first feature and the mixed metal oxide adhesion layer of the second feature,
   wherein the metal adhesion layer comprises a second primary metal that is different than the first primary metal.

2. The heat-assisted magnetic recording head of claim 1, wherein the mixed metal oxide adhesion layer comprises:
   an element; and
   an oxide of a reducing metal, and
   wherein the oxide region comprises an oxide of the element.

3. The heat-assisted magnetic recording head of claim 2, wherein the reducing metal is beryllium, cerium, calcium, dysprosium, gadolinium, europium, hafnium, erbium, lanthanum, magnesium, lutetium, holmium, lithium, plutonium, praseodymium, terbium, strontium, samarium, scandium, thorium, thulium, ytterbium, yttrium, or combinations thereof.

4. The heat-assisted magnetic recording head of claim 2, wherein the reducing metal is yttrium.

5. The heat-assisted magnetic recording head of claim 2, wherein the element is silicon, aluminum, or niobium.

6. The heat-assisted magnetic recording head of claim 2, wherein a free energy of oxide formation of the reducing metal is greater than a free energy of oxide formation of the element.

7. The heat-assisted magnetic recording head of claim 1,
   wherein the first primary metal is selected from gold; ruthenium; rhodium; palladium; osmium; iridium; platinum; or silver, and
   wherein the second primary metal is selected from iridium; platinum; palladium; rhodium; osmium; rhenium; tungsten; or combinations thereof.

8. The heat-assisted magnetic recording head of claim 7,
   wherein the first primary metal is gold, and
   wherein the second primary metal is iridium.

9. The heat-assisted magnetic recording head of claim 1, wherein the first feature comprises 90 percent atomic or greater of the first primary metal.

10. The heat-assisted magnetic recording head of claim 1, wherein the metal adhesion layer comprises 90 percent atomic or greater of the second primary metal.

11. The heat-assisted magnetic recording head of claim 1, wherein the first feature is a near-field transducer of the heat-assisted magnetic recording head.

12. The heat-assisted magnetic recording head of claim 1, wherein the first feature is a feature of a near-field transducer of the heat-assisted magnetic recording head.

13. The heat-assisted magnetic recording head of claim 12, wherein the feature of the near-field transducer is a disk.

14. The heat-assisted magnetic recording head of claim 12, wherein the feature of the near-field transducer is a peg.

15. The heat-assisted magnetic recording head of claim 1, wherein the first feature is a miniature solid immersion mirror of the heat-assisted magnetic recording head.

16. The heat-assisted magnetic recording head of claim 1, wherein the first feature, the metal adhesion layer, the mixed metal oxide adhesion layer of the second feature, and the oxide region of the second feature are provided in a layered configuration, wherein the layering is along a layering axis.

17. The heat-assisted magnetic recording head of claim 16, wherein a thickness of the mixed metal oxide adhesion layer is from about 0.1 angstrom to about 10 angstroms in a dimension of the layering axis.

18. The heat-assisted magnetic recording head of claim 16, wherein a thickness of the metal adhesion layer is from about 0.1 angstrom to about 10 angstroms in a dimension of the layering axis.

19. The heat-assisted magnetic recording head of claim 1, wherein the mixed metal oxide adhesion layer comprises:
   a first species that results from oxidation of a reducing metal, the reducing metal configured to reduce an oxide of the oxide region of the second feature; and
   a second species that results from reduction of the oxide of the oxide region by the reducing metal.

20. A heat-assisted magnetic recording head comprising:
   a first feature comprising a first primary metal,
   a second feature comprising:
      an oxide region; and
      a mixed metal oxide adhesion layer, and
   a bilayer adhesion structure comprising:
      the mixed metal oxide adhesion layer of the second feature; and
      a metal adhesion layer comprising a second primary metal that is different than the first primary metal,
   wherein the first feature, the metal adhesion layer, the mixed metal oxide adhesion layer, and the oxide region are provided in a layered configuration along a layering axis,
   wherein a first surface of the mixed metal oxide adhesion layer is adhered to a surface of the oxide region,
   wherein a first surface of the metal adhesion layer is adhered to a second surface of the mixed metal oxide adhesion layer,
   wherein a surface of the first feature is adhered to a second surface of the metal adhesion layer,
   wherein the second surface of the mixed metal oxide adhesion layer comprises an element, and
   wherein the oxide region comprises an oxide of the element.

* * * * *